(12) United States Patent  (10) Patent No.: US 7,947,945 B2
Bookbinder et al.  (45) Date of Patent: May 24, 2011

(54) FIBER OPTIC SENSING SYSTEM, METHOD OF USING SUCH AND SENSOR FIBER

(75) Inventors: Dana Craig Bookbinder, Corning, NY (US); Xin Chen, Corning, NY (US); Ming-Jun Li, Horseheads, NY (US); Daniel Aloysius Nolan, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/393,415

(22) Filed: Feb. 26, 2009

(65) Prior Publication Data

US 2009/0219516 A1  Sep. 3, 2009

Related U.S. Application Data

(60) Provisional application No. 61/067,738, filed on Feb. 29, 2008.

(51) Int. Cl.
*G02B 6/00* (2006.01)
*G01N 21/00* (2006.01)

(52) U.S. Cl. ............... 250/227.14; 385/13; 385/125; 356/73.1; 398/9

(58) Field of Classification Search ........... 250/227.11, 250/227.14, 227.15, 227.16, 227.17; 385/12, 385/13, 123, 125; 356/73.1; 398/9, 10, 13, 398/17, 20, 21
See application file for complete search history.

(56) References Cited

U.S. PATENT DOCUMENTS

| | | | |
|---|---|---|---|
| 5,627,921 A * | 5/1997 | Lidgard et al. | 385/12 |
| 6,201,912 B1 * | 3/2001 | Kempen et al. | 385/37 |
| 6,208,776 B1 * | 3/2001 | Prohaska et al. | 385/13 |
| 7,369,730 B2 * | 5/2008 | Childers | 385/123 |
| 7,424,194 B2 * | 9/2008 | Chen et al. | 385/123 |
| 7,444,838 B2 * | 11/2008 | Pickrell et al. | 65/435 |
| 7,450,806 B2 * | 11/2008 | Bookbinder et al. | 385/125 |
| 7,450,807 B2 * | 11/2008 | Bickham et al. | 385/126 |
| 7,458,734 B2 * | 12/2008 | Bookbinder et al. | 385/96 |
| 7,505,660 B2 * | 3/2009 | Bickham et al. | 385/125 |
| 7,526,166 B2 * | 4/2009 | Bookbinder et al. | 385/125 |
| 7,567,742 B2 * | 7/2009 | Pickrell et al. | 385/125 |
| 2005/0094954 A1 * | 5/2005 | Pickrell et al. | 385/123 |
| 2005/0111805 A1 * | 5/2005 | Hertz et al. | 385/125 |
| 2006/0067632 A1 * | 3/2006 | Broeng et al. | 385/96 |
| 2006/0083471 A1 * | 4/2006 | Berkey et al. | 385/125 |
| 2006/0133753 A1 * | 6/2006 | Nelson et al. | 385/125 |
| 2006/0140529 A1 * | 6/2006 | Childers | 385/4 |
| 2007/0104437 A1 * | 5/2007 | Bookbinder et al. | 385/125 |

(Continued)

FOREIGN PATENT DOCUMENTS

EP 0649007 10/1994

(Continued)

OTHER PUBLICATIONS

"Distributed Fiber-Optic Intrusion Sensor System"; Juarez, et al; Journal of Lightwave Technology, vol. 23, No. 6, Jun. 2005.

*Primary Examiner* — John R Lee
(74) *Attorney, Agent, or Firm* — Svetlana Z. Short (57) ABSTRACT

An embodiment of a sensor fiber includes: at least two fiber sections with a plurality of holes; and at least one other fiber section situated between said at least two fiber sections, wherein the at least one other fiber sections being without the plurality of holes.

20 Claims, 7 Drawing Sheets

U.S. PATENT DOCUMENTS

| | | | |
|---|---|---|---|
| 2007/0122095 A1* | 5/2007 | Broeng et al. | 385/125 |
| 2007/0165978 A1* | 7/2007 | Chen et al. | 385/12 |
| 2007/0269175 A1* | 11/2007 | Chen et al. | 385/125 |
| 2008/0013905 A1* | 1/2008 | Bookbinder et al. | 385/124 |
| 2008/0056657 A1* | 3/2008 | Pickrell et al. | 385/125 |
| 2008/0056658 A1* | 3/2008 | Bickham et al. | 385/127 |
| 2008/0110209 A1* | 5/2008 | Bookbinder et al. | 65/378 |
| 2008/0124028 A1* | 5/2008 | Bickham et al. | 385/55 |
| 2008/0166094 A1* | 7/2008 | Bookbinder et al. | 385/124 |
| 2008/0181567 A1* | 7/2008 | Bookbinder et al. | 385/127 |
| 2008/0205839 A1* | 8/2008 | Bickham et al. | 385/127 |
| 2008/0304800 A1* | 12/2008 | Bickham et al. | 385/127 |
| 2009/0032983 A1* | 2/2009 | Bookbinder et al. | 264/1.24 |
| 2009/0060436 A1* | 3/2009 | Bickham et al. | 385/124 |
| 2009/0126407 A1* | 5/2009 | Bookbinder et al. | 65/391 |
| 2009/0126408 A1* | 5/2009 | Bookbinder et al. | 65/415 |
| 2009/0148113 A1* | 6/2009 | Bickham et al. | 385/127 |
| 2009/0154888 A1* | 6/2009 | Abbott et al. | 385/124 |
| 2009/0219516 A1* | 9/2009 | Bookbinder et al. | 356/73.1 |

FOREIGN PATENT DOCUMENTS

| | | |
|---|---|---|
| NL | 8401361 | 4/1984 |
| WO | 2004/049025 | 6/2004 |

* cited by examiner

FIBER OPTIC SENSING SYSTEM, METHOD OF USING SUCH AND SENSOR FIBER

This application claims the benefit of priority under 35 U.S.C. §119 (e) of U.S. Provisional Application Ser. No. 61/067,738 filed on Feb. 29, 2008.

BACKGROUND OF THE INVENTION

The present invention relates generally to a method and apparatus for detecting a disturbance along a length of optical fiber. More specifically, the present invention uses Optical Time Domain Reflectometry (OTDR) to ascertain if there has been a disturbance along the length of the optical fiber.

TECHNICAL BACKGROUND

Fiber sensors continue to be more prevalent as new applications are found in existing and in new markets. Current applications include architectural and structuring monitoring, temperature and pressure measurements, intrusion detection, etc. The sensing can be done at discrete points for in a distributed fashion. Standard single mode and multimode fibers are often adequate for these applications. However, specialty fibers are often required in order to meet the requirements for specific applications. Such specialty fibers include high delta and polarization maintaining fibers for gyroscopes, photosensitive fibers for Bragg gratings, and fibers for distributed fiber sensors.

However, existing specialty fibers do not address some of the needs of some of applications. Distributed fiber sensors, can measure or sense perturbations along the path of the fiber and provide generalized location information of the perturbation. Bragg fiber sensor(s) are utilized in some new commercial sensing applications addressing such needs. Bragg fiber sensors are useful for structural monitoring in specific locations, but their implementation is very costly and as such the total market for the technology may be limited.

A number of OTDR (optical time domain reflectometry) based sensor systems are commercially produced. Many of these systems have detection zone lengths from tens of meters up to several kilometers. Oftentimes, these systems will only identify whether or a problem has occurred within the detection zone. It would be advantageous to obtain the information only at the required, specified locations of the disturbance.

SUMMARY OF THE INVENTION

One aspect of the invention is a sensor fiber includes: at least two fiber sections with a plurality of holes; and at least one other fiber section situated between the at least two fiber sections, wherein the at least one other fiber sections being without the plurality of holes.

In another aspect, the present invention includes fiber optic sensing system comprising: (a) transmitter for launching a pulsed optical signal; (b) a sensor fiber to carry at least a portion of said optical signal sensitive to a disturbance (for example micro- or macro-bending of the fiber, strain, and/or pressure on the fiber) therealong, the sensor fiber including a plurality of holes; and (c) a receiver for receiving a portion of a backscattered optical signal from said sensor fiber.

In yet another aspect, the present invention includes an fiber optic sensing system comprising: (a) transmitter for launching a wavelength invariant pulsed optical signal; (b) a sensor leg, the sensor leg comprising a sensor fiber to carry at least a portion of said optical signal sensitive to a disturbance therealong, said sensor optical fiber including a plurality of holes; and (c) a receiver for receiving a portion of a backscattered optical signal from said sensor leg.

In yet another aspect a method of detecting a disturbance at a determinable portion along a length of optical fiber comprises:

providing a sensor fiber that includes at least two fiber sections with a plurality of holes and at least one other fiber section situated between the at least two fiber sections, the at least one other fiber sections being without the plurality of holes;

launching a pulsed optical signal for carrying within the sensor fiber;

capturing reflected signal traces from the sensor fiber;

obtaining a disturbance trace from the sensor fiber; and comparing said disturbance trace to an undisturbed trace so as to determine a disturbance at a portion of the sensor fiber.

According to some embodiment, the fiber optic sensing system is an OTDR system for detecting a perturbation along a determinable portion of a structure. According to some of these embodiments the OTDR system comprises:

(A) a transmitter launching a pulsed optical signal;

(B) a sensor fiber, the sensor fiber having (i) at least two fiber sections containing a plurality of holes, and (ii) sensing elements adjacent to said fiber sections, said sensor fiber caring at least a portion of said pulsed optical signal;

(C) a receiver accepting a portion of a backscattered optical signal from the sensor fiber; and (D) a signal processor for providing a signal response output indicative of a perturbation; wherein said backscattered optical signal provides information about location of the disturbance along the sensor fiber; and wherein the location of the disturbance along the sensor fiber corresponds to specific sensing elements situated within said fiber.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

The invention will be described for the purposes of illustration only in connection with certain embodiments; however, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

In fiber optic time domain reflectometer systems, a temporal pulse (typically 10 nanoseconds (ns) to 10 milliseconds (ms)) of light is launched into an optical fiber (sensor fiber). As this pulse propagates in the sensor fiber, some of its energy is backscattered due to Rayleigh scattering. The optical characteristics of the backscattered light are dependent upon the fibers' physical and optical properties. When the sensor fiber is broken, bent, or other wise perturbed, the characteristics of the backscattered light change, and the change can be detected and analyzed.

Information on the physical and optical properties of the fiber can be obtained as a function of fiber length by analyzing the optical properties of the backscattered light in the temporal domain. Further, if the local properties of the sensor fiber are disrupted, then analysis of the change in backscattered light can be used to locate a disturbance along the length of the fiber. The intensity, optical phase, and relative polarization are the three main properties of the backscattered light that can be analyzed. Optical instruments that analyze the phase, polarization, and intensity of the backscattered light are, for example, Optical Time Domain Reflectometers (OTDRs).

Figure 1:
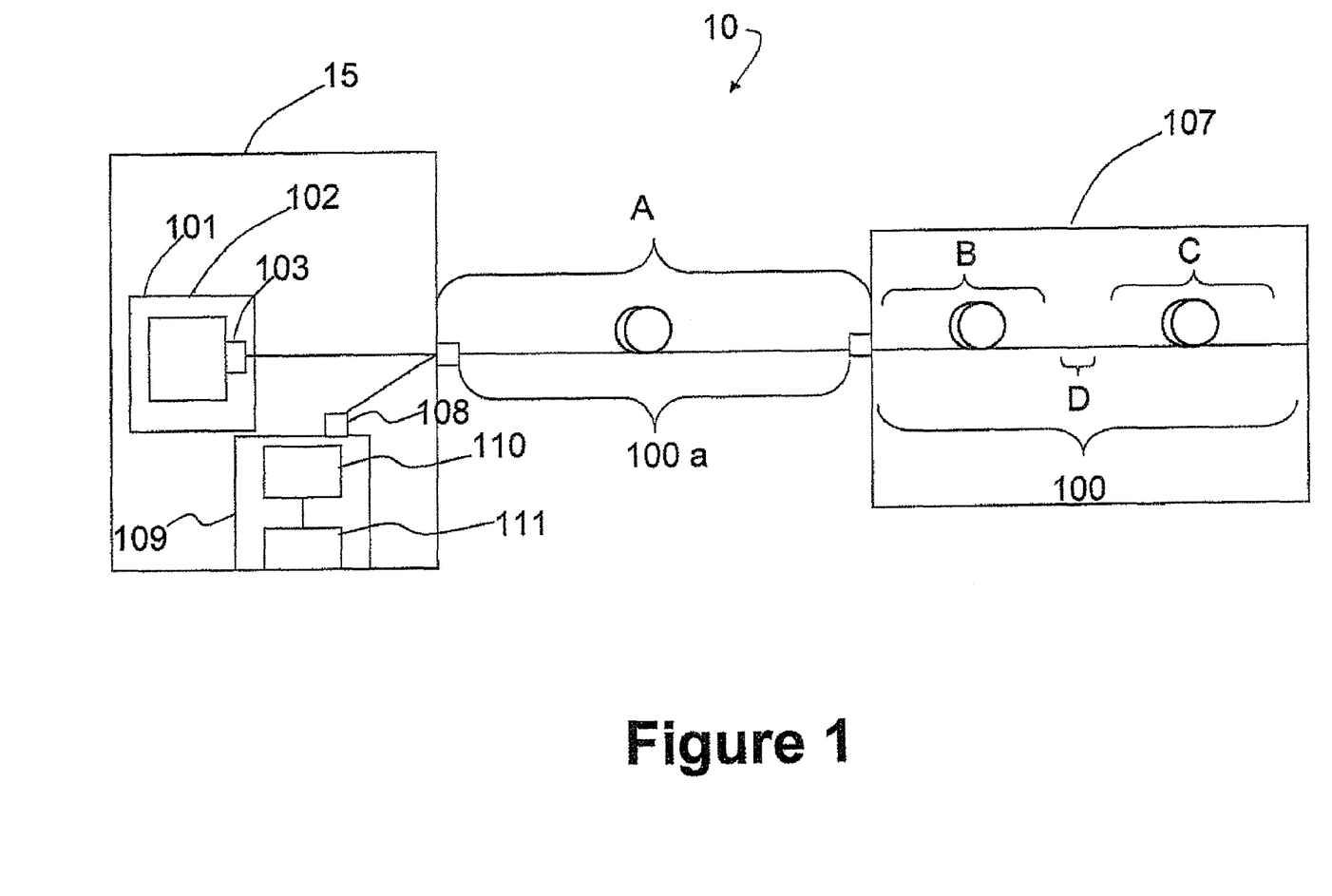
FIG. 1 is an OTDR fiber optic sensor in accordance with one embodiment of the present invention.

Reference will now be made in detail to the present preferred embodiment(s) of the invention, examples of which are illustrated in the accompanying drawings. Whenever possible, the same reference numerals will be used throughout the drawings to refer to the same or like parts. One embodiment of the present invention is shown in FIG. 1, and is designated generally throughout by the reference numeral 10.

EXAMPLES

The invention will be further clarified by the following examples.

Example 1

Figure 2:
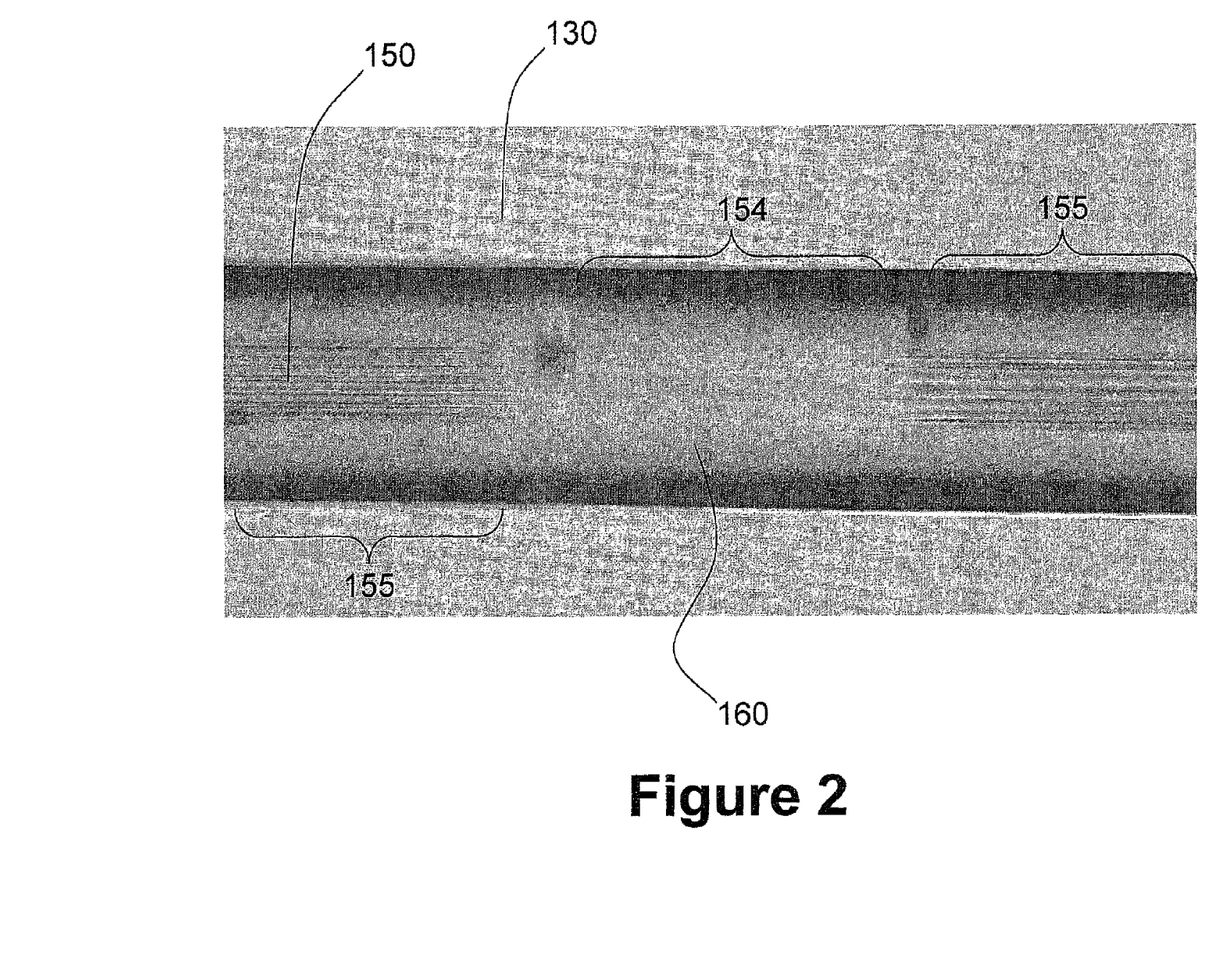
FIG. 2 is a schematic cross-sectional view of a sensor fiber according to one embodiment of the present invention.
Figure 3:
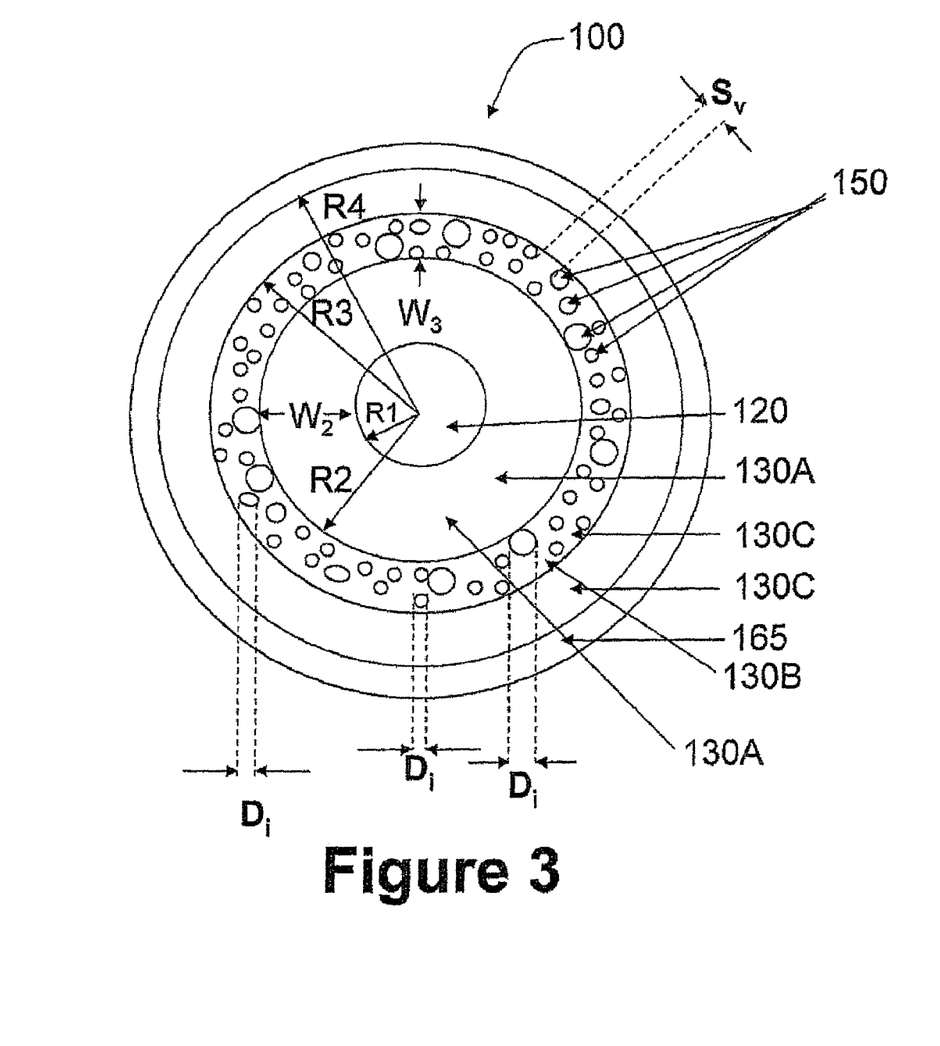
FIG. 3 illustrates a side view of a section of the sensor fiber shown in FIG. 2

FIG. 1 is a schematic diagram of an OTDR based sensor system 10 that utilizes an OTDR 15 and a sensor fiber 100. The sensor fiber 100, according to one embodiment of the present invention, is illustrated in FIGS. 2 and 3 and is described further down in the specification. With reference to FIG. 1, light from a transmitter 101 that includes a pulsed laser source 102 is launched via connector 103 into one arm of a 50:50 fiber optic directional coupler 112, which is optically connected to the sensor fiber 100 through a connecting fiber 110a. A fiber optic circulator (not shown) can be utilized instead of coupler 112. The pulsed laser source 102 is typically a solid-state semiconductor laser diode operating at a center wavelength of 1550 nanometers (nm) with a Full Width Half Maximum (FWHM) spectral linewidth from around 1 nm to as much as 10 nm. Ideally, the linewidth of the source should be around 1 nm in order to avoid too much depolarization of the light as it propagates along the optical fiber. In order to avoid excessive depolarization, a fiber with a small polarization mode dispersion (PMD) value should be chosen (e.g., a standard single mode fiber such as Corning SMF-28®, produced by Corning Inc. of Corning, N.Y., US). Sources with line widths substantially smaller than 1 nm should also be avoided as coherent noise problems may occur. The use of sources with center wavelengths around 1550 nm will also allow an extended range of the present invention because this wavelength is compatible with optical amplifiers such as those based on Erbium doped optical fiber. The attenuation of silica based communications fiber is also minimal at 1550 nm. Other source wavelengths that may be used include those around 1300 nm, 850 nm, and 905 nm.

With continued reference to FIG. 1, half of the launched light then propagates along the sensor fiber 100, which is situated in the area 107 that is subject to sensing/detection.

The back-scattered light propagates from the sensor fiber to the directional coupler 112 where a portion of the back-scattered light is tapped off into the receiver leg 109 of the OTDR 15 via connector 108. The receiver leg 109 includes a receiver 110, for example a photodiode with an amplifier that detects the backscattered light. The receiver 110 may include an avalanche photodiode, a pin photodiode, a photomultiplier tube, or any suitable receiving element. The output of the receiver 110 as a function of time measures the backscattered light that propagated along the length of sensor fiber. If the sensor fiber is disturbed particular specified point(s) along the length of sensor fiber 100, then the temporal output from the photodiode will change. If the magnitude of the backscattered power is very low, a certain number of OTDR traces can be averaged reduce the noise. Also, filtering can be employed to reduce the noise or unwanted signal from the OTDR traces. The fiber optics sensing system 10 may also include a signal processor 111 for providing a signal response output indicative of a perturbation, bending (e.g., micro- or macro-bending of the fiber), or a disturbance (e.g., pressure on the fiber) within the sensor fiber 100.

Still further, it should be understood that while the back-scattered optical signal provides intensity and/or timing information relative to the optical signal sufficient to determine a location of a disturbance along the optical fiber, the actual disturbance is detected by sensing changes between sets of sampled traces or time waveforms. In this regard, the intensity and/or timing information should be understood to optionally include changes between sets of sampled traces or time waveforms, not just timing information from the start of a pulse on one waveform.

It should be understood that the output (i.e., OTDR signal) of the receiver 110 may be processed a signal processor 111 which may include any suitable computing means such as, but not limited to, a personal computer, laptop, customized microprocessor-based unit, or the like. One method of processing the OTDR signals is to capture a number of OTDR traces, then digitally filter, average them, and later repeat the process. From the difference between these two resultant processed OTDR traces, it is seen whether there has been a disturbance along the length of fiber.

The fiber optic sensing system 10 of FIG. 1 utilizes sensor fiber 100. This sensor fiber 100 is illustrated in FIGS. 2 and 3 and includes a core 120 and at least one cladding 130 with plurality of closed holes (annular ring of closed airlines) 150 in fiber sections 155. The holes or airlines 150 are collapsed (eliminated) at one or more locations 154 within the fiber 100. Alternatively, sensor fiber 100 may include a plurality of fiber sections 155 with a plurality of holes or airlines and at least one (and preferably more) segments of another fiber 156 (i.e., a fiber that doesn't have the holes or airlines) spliced therebetween in locations 154. It is noted that fiber sections 155 with the plurality of airlines are not sensitive to bending and have low losses, but the fiber sections without the airlines is sensitive to bending and/or other perturbations. Thus, one can dramatically change the propagation properties of the fiber locally by collapsing the annular ring of holes of the fiber at specific locations 154, or by inserting segments of bend sensitive fiber 156 between fiber sections 155. The terms holes, voids and airlines may be used interchangeably herein.

Referring to FIGS. 1-3, the optical fiber 100 disclosed herein comprises a core 120 and at least one cladding layer (or cladding) 130 surrounding and directly adjacent the core. The core 120 has a refractive index profile, $\Delta_{Core}(r)$. The cladding 130 has a refractive index profile, $\Delta_{CLAD}(r)$. The cladding 130 comprises a region of pure silica surrounded by region containing random air holes situated within Si based glass.

In some embodiments, the core comprises silica doped with germanium, i.e. germania doped silica. Dopants other than germanium, singly or in combination, may be employed within the core, and particularly at or near the centerline, of the optical fiber disclosed herein to obtain the desired refractive index and density.

Figure 4:
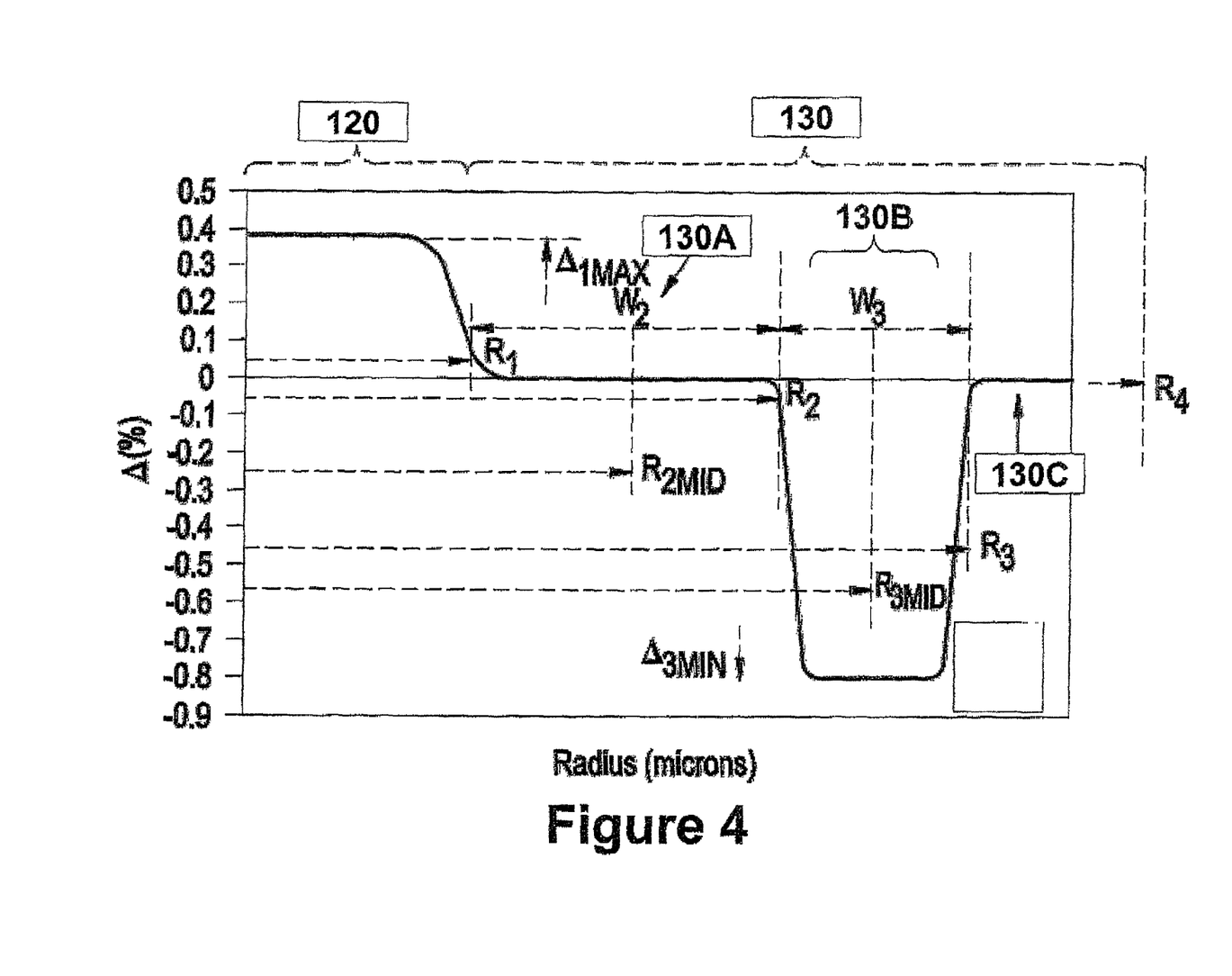
FIG. 4 is a schematic illustration of the refractive index profile of the sensor fiber of FIG. 3.

Referring to FIGS. 2-4, exemplary fibers 100 comprise: a core 120 extending radially outwardly from the centerline to a central segment outer radius, $R_1$ (preferably >3 μm, for example 4, 5 or >5 μm), and having a relative refractive index profile, $\Delta_1(r)$ in % at 1550 nm, with a maximum relative refractive index percent, $\Delta_{1MAX}$ (preferably ≦0.3% and greater than 0.1%); and, a cladding 130 surrounding and directly adjacent, i.e. in direct contact with, the core 120. Preferably, the core 120 has a delta maximum refractive index delta, relative to pure silica, of less than 0.4%, and outer radius $R_1$, such that 3 μm≦$R_1$≦7.5 μm. Cladding 130 may comprise: a first annular cladding region 130A surrounding the core 120 and directly adjacent thereto, extending radially outwardly to a second annular region 130B and characterized by radius outer $R_2$, this region 130A having a width $W_2$ ($W_2=R_2-R_1$), and a relative refractive index profile, $\Delta_2(r)$ in %, with a maximum relative refractive index percent, $\Delta_{2MAX}$, in % (where $\Delta_{2MAX}$ is preferably less than about 0.025%), a minimum relative refractive index percent, $\Delta_{2MIN}$, in %; the second annular cladding region 130B surrounding region 130A and directly adjacent thereto, and extending radially outwardly from $R_2$ to an radius $R_3$, the region 130B having a width $W_3$, and having a relative refractive index profile, $\Delta_3(r)$ in percent (%), with a minimum relative refractive index percent, $\Delta_{3MIN}$, in % (preferably $\Delta_{3MIN}$≦−0.3%), wherein $\Delta_{1MAX}$>0>$\Delta_{3MIN}$; and a third annular cladding region 130C surrounding the region 130B and directly adjacent thereto and having a relative refractive index percent, $\Delta_4(r)$ in %. $R_1$ is defined to occur at the radius where $\Delta_1(r)$ first reaches +0.05%. That is, core 120 ends and the annular region 130A starts where the relative refractive index first reaches +0.05% (going outward radially) at a radius $R_1$, and region 130A is defined to end at a radius $R_2$ where the relative refractive index $\Delta_2(r)$ first reaches −0.05%, going outward radially. The second annular cladding region 130B begins at $R_2$ and ends at $R_3$ for this group of embodiments. $R_3$ is defined to occur where the relative refractive index $\Delta_3(r)$ reaches the value of −0.05% (going outward radially), after $\Delta_3(r)$ has dipped to at least −0.05%. The width $W_3$ of the second annular cladding region 130B is $R_3-R_2$ and its midpoint is $R_{3MID}$ is $(R_2+R_3)/2$. In some embodiments, more than 90% of the core 120 has a positive relative refractive index, and in some embodiments $\Delta_1(r)$ is positive for all radii from 0 to $R_1$. In some embodiments, $|\Delta_2(r)|<0.025\%$ and $|\Delta_{2max}-\Delta_{2min}|<0.05\%$ for more than 50% of the radial width of the first annular cladding region 130A, and in other embodiments $|\Delta_2(r)|<0.01\%$ for more than 50% of the radial width of the first annular region 30. $\Delta_3(r)$ is negative for all radii from $R_2$ to $R_3$. Preferably, $\Delta_{CLAD}(r)=0\%$ for all radii greater than 30 μm. In this embodiment, cladding 130 extends to a radius, $R_4$, which is also the outermost periphery of the glass part of the optical fiber. Also, $\Delta_{1MAX}>\Delta_{2MAX}>\Delta_{3MIN}$, and $\Delta_{2MIN}>\Delta_{3MIN}$.

In this embodiment the second annular region 130 comprises silica based glass (either pure silica, or silica doped with for example, germanium, aluminum, phosphorus, titanium, boron, and fluorine) with a plurality of closed randomly dispersed holes 150, the holes 150 being either empty (vacuum) or gas (e.g. argon, or air) filled. Such holes can provide an effective refractive index which is low, e.g. compared to pure silica.

More specifically, referring to FIGS. 3 and 4, the fiber core region 120 (with a step index, $n_1$,) is surrounded by the first annular cladding region 130A, which is situated adjacent to and is surrounded by the second annular region 130B, which is further surrounded by a third annular cladding region 130C, which can optionally be surrounded by one or more polymer coatings 165. The relative percent index of refraction (Δn %) in second annular region 130B fluctuates between −28% (index of void filled gas relative to that of silica) and that of the glass surrounding the holes (in this example it is silica, with the relative % index of refraction $\Delta n_s$ of about 0%). A typical average relative refractive index percent $\Delta n_{ave}$ of the second annular region 130B will be negative, preferably less than −0.4% (or example, $\Delta n_{ave}$ of the second annular region 130B may be −0.5%, −0.6%, −0.7%, −0.8%, −0.9%, or −1.%) and more preferably between −1% and −3%, relative to pure silica glass, depending on the dopants present in the glass surrounding the holes. That is, the index second annular cladding region 130B fluctuates, and in the example of FIG. 3, the width of the gas filled holes, and/or the glass filled spacing $S_v$ between the gas filled holes 150 is randomly distributed and/or are not equal to one another. That is, the holes 150 are non-periodic. It is preferable that the mean distance between the holes 150 is less than 5000 nm, more preferably less than 2000 nm, even more preferably less than 1000 nm, for example 750 nm, 500 nm, 400 nm, 300 nm, 200 nm or 100 nm. Preferably, at least 80%, and more preferably at least 90% of the holes 150 have a maximum cross-sectional dimension Di of less than 1000 nm, preferably less than 500 nm. Even more preferably, the mean diameter of the holes 150 is less than 1000 nm, more preferably less than 500 nm, and even more preferably less than 300 nm. The holes 150 are closed (surrounded by solid material) and are non-periodic. That is, the holes 150 may have the same size, or may be of different sizes. The distances between holes may be uniform (i.e., the same), or may be different. Preferably the second annular cladding region 130B contains at least 10 holes, more preferably at least 50 holes, more preferably at least 100 holes.

Preferably, $\Delta_{1MAX}<0.4\%$ (e.g., −0.2%. −0.25%, or −0.3%), $\Delta_{2MIN}>-0.05\%$, $\Delta_{2MAX}<0.05\%$, $\Delta_{3MIN}<-0.3\%$, $0.1<R_1/R_2<0.8$ (e.g., 0.6 or less, 0.7 or 0.75), with $R_1$ preferably <5 μm. Preferably, $\Delta_{3MIN}<-0.3\%$, More preferably, $\Delta_{3MIN}<-0.45\%$, and even more preferably ≦−0.7%. When we say, for example, Δ<−0.5%, we mean Δ is more negative than −0.5%.

Preferably $0.15<R_1/R_2<0.5$. In some embodiments, $0.2<R_1/R_2\leq0.4$, for example $R_1/R_2=0.25$, 0.28, 0.3, 0.33, 0.35, 0.38, or 0.4.

In some embodiments $W_2>\frac{2}{3} R_1$, in some embodiments $W_2>R_1$, and in some embodiments, $W_2>2R_1$. In some embodiments $W_2>5$ μm. For example, $W_2$ may be at least: 5.5 μm, 8 μm, or even greater than 10 μm. Preferably, 10 μm>$W_2$>16 μm.

In some embodiments, $0.1\%<\Delta_{1MAX}<0.3\%$, preferably $0.17\%<\Delta_{1MAX}<0.28\%$, or more preferably $0.17\%<\Delta_{1MAX}<0.25\%$.

Preferably, $7.2\geq R_1\geq3.0$ μm, more preferably more preferably $7.0\geq R_1\geq3.5$. μm.

Preferably, $R_2>6$ μm, more preferably >8 μm and, in some embodiments, equal to or greater than about 15.0 μm, for example $R_2\geq20$ μm. In some embodiments $W_2$ is between about 3 μm and 18 μm, and in some embodiments, $W_2$ is between about 5 μm and 15 μm, for example 6 μm or 7 μm.

Preferably, $R_3>11.0$ μm, and in some embodiments 11.5 μm<$R_3$<30.0 μm, for example, $R_3$ is about 11 μm, 12 μm, 13 μm, 15 μm or 20 μm.

In some embodiments $W_3>1.0$ μm, in some embodiments $W_3>2.0$ μm, for example 2.0<$W_3$<10.0 μm. In some embodiments $W_3$ is less than 6.0 μm, and in some embodiments $3.0\leq W_3\leq9.0$ μm, in some embodiments $W_3$ is less than 6.0 μm, and in some embodiments $3.0\leq W_3\leq7.0$ μm. Also in some embodiments, $\Delta_{3MIN}$ is less than −0.35%, and in some other embodiments, less than −0.5%, and more preferably less than −0.7%.

Preferably, $R_4>50$ μm. In some embodiments, $R_4\geq55$ μm. In other embodiments, $R_4\geq60$ μm. In some embodiments, 60 μm$\leq R_4\leq90$ μm. For example, $R_4$ may be 62.5 μm, 70 μm, 75 μm, 80 μm, or 85 μm.

In some embodiments, the central segment of the core 120 may comprise a relative refractive index profile having a so-called centerline dip which may occur as a result of one or more optical fiber manufacturing techniques. For example, the central segment may have a local minimum in the refractive index profile at radii less than 1 μm, wherein higher values for the relative refractive index (including the maximum relative refractive index for the core segment) occur at radii greater than r=0 μm.

Some exemplary optical fibers 100 disclosed herein provides: a mode field diameter at 1550 nm (in a region 154 without the holes 150) is greater that 9 μm, and in some embodiments, between 10 μm and 16 μm.

Thus, a distributed fiber sensor can be fabricated by utilizing a sensor fiber 100, by locally collapsing the holes 150 of fiber 100 at specific locations 154 (see FIGS. 1 and 2), or by splicing sections of bending sensitive fiber into these locations 154. The sensor fiber 100 can be designed so that it is very sensitive to macro-bending and or micro-bending at these locations (i.e., where the holes are collapsed, or where segment(s) of bend sensitive fiber is present) and not sensitive to bending in the areas containing holes. These "collapsed" locations (or locations where airlines or holes are not present) of the sensor fiber 100 are referred herein as sensing elements 160 and can be situated only in the areas where detection of perturbation is important. Because the rest of the fiber is not bend sensitive, propagating light will not be strongly attenuated by bending or other perturbations in the section(s) containing holes 150, enabling the light to propagate further (along longer length) within the sensor fiber 100. That is, the sections 155 of the fiber 100 (i.e., portions of the fiber 100 without sensor element(s) 160) are robust enough, for example by being bending insensitive, so that the light can get to the sensor portion(s) 160 without significant loss (i.e., less than 0.2 dB, preferably less than 0.1 dB).

An integrated series of such sensing elements 160, in conjunction with a low cost OTDR device, for example, optical sensing system 10 illustrated in FIG. 1, will enable one to detect a defect or stress area within the optical fiber 100 and to pinpoint the location of this defect or stress area 154. Long temporal pulse widths (i.e. greater than 50 ns pulse width, or more preferably greater than 100 ns or 500 ns) will be a characteristic of a low cost OTDR (Low cost OTDRs are readily commercially available OTDR with pulse width between 10 ns and 1 ms, or larger. Pulse width shorter than 10 ns correspond to OTDRs considered to be expensive), because low cost electronic components or commercial OTDR devices can than be used in the sensing system 10. Longer pulse width means that the OTDR signal can have a longer reach, but possibly at the expense of reduced local spatial resolution. However the center of the local perturbation (specific location D corresponding to a specific area 154) can always be identified by locating the center of step change of fiber loss along its path (See FIG. 6, described below).

Another important sensor application for this kind of sensor fiber 100 will be structural monitoring sensing. The locations (sensing elements 160) will serve as local sensors or point location sensors, for detecting stresses, bending and/or perturbation only at specific locations 154. In fact through proper fiber design as will be illustrated below, the sensitivity of the selected sensing elements 160 can be controlled to be more sensitive or less sensitive, as needed. Therefore, fiber 100 with the sensing elements 160 may be utilized to replace fiber with Bragg gratings. Note that both fiber gratings and sensing elements 160 enable one to locally change the propagation properties of a fiber. However it can be expected that the sensing elements 160 will be of significantly lower cost than Bragg grating elements. For example, the micro-bend multimode fiber sensors can be as bend sensitive as Bragg grating sensors.

If the fiber 100 is a single mode fiber, the attenuation of single mode bending sensor elements 160 is generally dependent on the severity (i.e., radius) of the bend. The level of fiber bending sensitivity of sensing elements 160 in sensor fiber 100 can be controlled by the design parameters. For example, higher sensitivity to bending, which means the significant loss can be incurred at larger fiber bending radius or diameter, can be accomplished by using lower core delta (e.g., lower than 0.35% relative to pure silica), so that micro-bending or macro-bending is easily introduced when the airlines are collapsed at certain selected portions of the fiber. Both macro and micro bending induce attenuation in optical fibers. Microbending induces mode coupling, causing light to couple from a propagating mode to a radiation or cladding mode. In order to induce microbending, periodic bending perturbations in length, provide for a phase matching condition between the propagating mode and the radiation mode. In standard single mode sensor fibers 100, these perturbations in length are required to be on the order of millimeters. On the other hand, in multimode sensor fibers 100, mode coupling can occur between a propagating mode and a radiation mode as well as between two or more propagating modes. Again high frequency perturbations on the order of millimeters are required to induce mode coupling between these modes. No phase matching conditions is required in order to induce macrobending attenuation. When the fiber 100 is bent to a small radius, the waveguide structure is altered so that the index at certain larger radii is above the effective index of the propagating mode. Macrobending at fiber areas 154 enables light to leak through the index barrier (core to cladding index change) to this high index cladding region and thereby exit the optical fiber 100. Thus, areas 154 of the fiber 100 can be utilized either as a microbending sensor or a macrobending sensor. In general, one is not limited to single mode fiber for making a fiber with sensing elements 160. The fiber 100 can also be a multimode fiber.

A few examples of single mode fibers are presented to illustrate several of the embodiments of the present invention. Table 1 lists these fiber parameters. Fiber 1 has a delta of 0.34%, is similar to SMF-28® fiber (Corning Inc, of Corning, N.Y.), but includes random airholes (see FIG. 2). As shown in Table 2 (which depicts fiber properties of Table 1 fibers) when the air lines are collapsed (no airlines), the bending loss of Fiber 1, when the fiber is bent with 10 mm bending radius is 12 dB/m. The addition of the random air lines significantly improves the bending sensitivity (makes the fiber bend insensitive). In order to get higher bending sensitivity of in selected portions of the fiber 100 (i.e., locations 154 with collapsed airlines), one may lower the fiber core delta, as shown, for example Fiber 2 and 3 of Table 1. (Note, all refractive index deltas of the exemplary fibers were modeled or measured at 1550 nm.) In sections 155 of the fiber 100 (sections that include the air lines), Fibers 2 and 3 have bending losses better than that of SMF-28®. However, when the air lines are collapsed, (as in sensing elements 160, fiber sections 154) Fibers 2 and 3 exhibit much higher bending sensitivity. For example, for the locations 154 of Fiber 2 that have no airlines present (e.g., collapsed airlines), the bending loss is 14.4 dB/m at the bending radius of 20 mm, while in contrast SMF 28® fiber has the loss of 12 dB/m at much smaller radius of 10 mm. Table 2 also shows that Fiber 3 has a high bending loss even when bent to a large radius (between 20 mm radius and 30 mm radius). The examples illustrate that we can design a fiber such that when the selected portions have collapsed air lines, these portions (sensing elements 160) have controlled (higher) amount of sensitivity to the bending. On the other hand, when the air lines are in place, even with lower core delta, the optical fiber has good bending properties (i.e., the portions of fiber 100 that have random airlines or holes are bending insensitive), which is advantageous for deployment in various environments.

TABLE 1

| | Examples | | |
|---|---|---|---|
| | Fiber 1 | Fiber 2 | Fiber 3 |
| $\Delta_{1MAX}$ (%) | 0.340 | 0.250 | 0.200 |
| R1 (µm) | 4.20 | 4.20 | 5.00 |
| Core Alpha | 1000 | 1000 | 1000 |
| R2 (µm) | 10.50 | 10.50 | 10.50 |
| R1/R2 | 0.40 | 0.40 | 0.48 |
| R2MID (µm) | 7.35 | 7.35 | 7.75 |
| W2 (µm) | 6.30 | 6.30 | 5.50 |
| W3 (µm) | 4.00 | 4.00 | 4.00 |
| $\Delta_{3MIN}$ (%) | −1.00 | −1.00 | −1.00 |
| R3MID | 12.50 | 12.50 | 12.50 |

TABLE 2

| | Examples | | | | | |
|---|---|---|---|---|---|---|
| | Fiber 1 | | Fiber 2 | | Fiber 3 | |
| MFD @ 1550 nm (µm) | 10.1 | | 11.1 | | 12 | |
| Aeff @ 1550 nm (µm²) | 78.7 | | 95 | | 114.7 | |
| Cutoff (µm) | 1.23 | | 1.06 | | 1.1 | |
| Bending loss at 10 mm Radius in sections 154 and 155 (w/o and w/ airlines 150), (dB/m) | 12 | 0.021 | >100 | 0.19 | >100 | 0.28 |
| Bending loss at 15 mm Radius in sections 154 and 155 (w/o and w/ airlines 150), (dB/m) | 0.44 | 1.40E−03 | >100 | 0.066 | >100 | 0.14 |
| Bending loss at 20 mm Radius w/o and w/ trench (dB/m) | 0.03 | 1.30E−04 | 14.4 | 0.023 | 35.3 | 0.059 |
| Bending loss at 30 mm Radius in sections 154 and 155 (w/o and w/ airlines 150), (dB/m) | >100 | >100 | >100 | >100 | 3.8 | 8.50E−03 |

The multimode fiber with lower core delta also has greater bending loss at a specific bending diameters. Therefore, one can design a multimode fiber having a lower core delta to enhance the bending sensitivity in sections without the air line (or with the collapsed air lines. Note that typical commercial multimode fibers have delta of either around 1% or around 2%, relative to pure silica glass.

Figure 5:
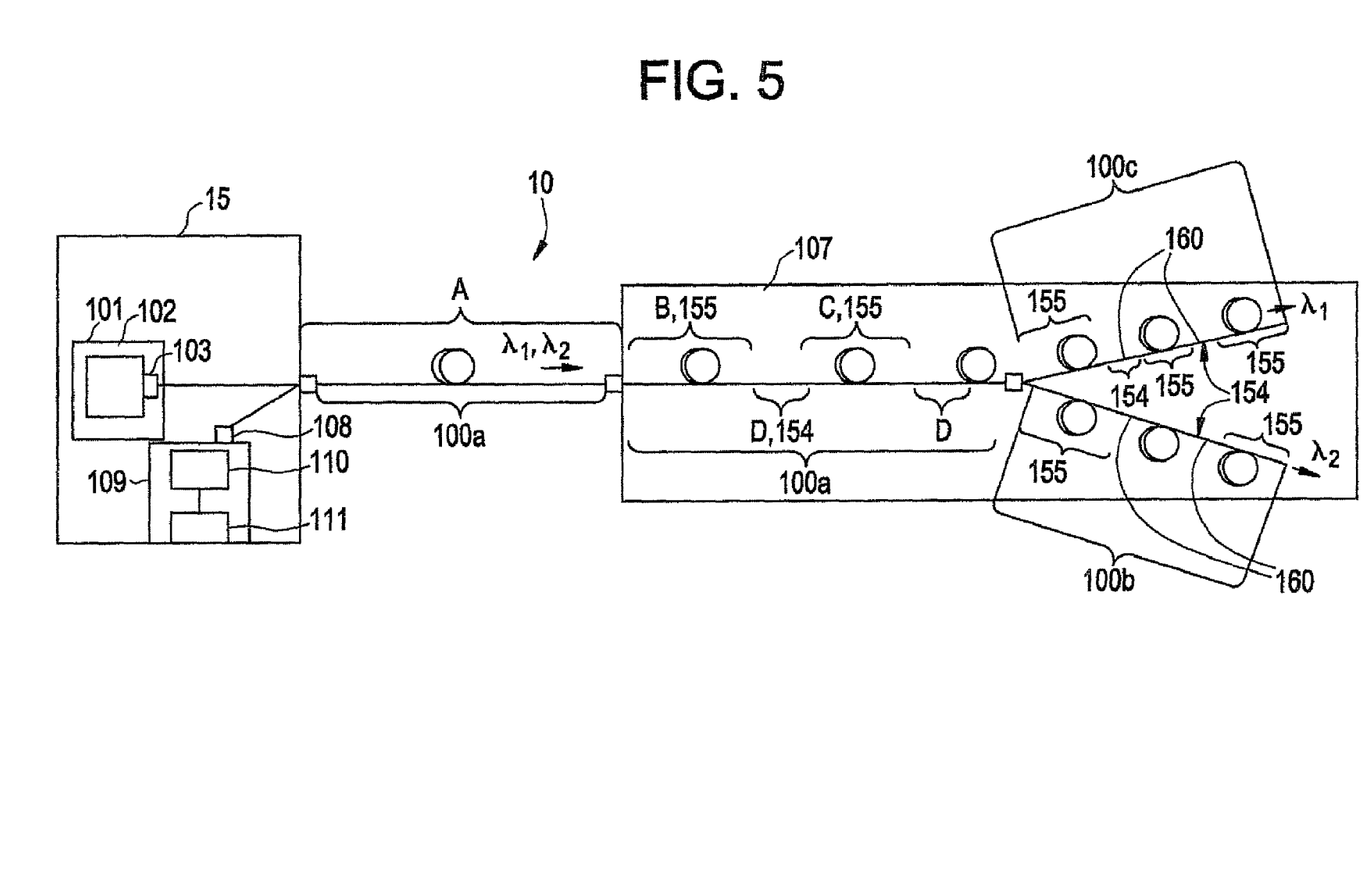
FIG. 5 is an OTDR fiber optic sensor in accordance with another embodiment of the present invention.

Sensing elements 160 may be utilized for distributed sensing applications, such as structural monitoring, in conjunction with a low cost OTDR. Furthermore, series of sensing elements 160 can be concatenated or multiplexed within sensor fiber 100 in order to sense perturbations in many sensing elements at once (e.g., a sensor fiber 100 may utilize a plurality of sensing elements 160). That is, the sensor fiber 100 with random airlines may have multiple portions of collapsed airlines at locations 154 that may serve as point location sensors. This is shown, schematically, in FIG. 5. It is also noted that the fiber optic sensor of FIG. 5 is capable of sensing and processing at least 2 different wavelengths $\lambda_1$, $\lambda_2$, and thus can detect perturbations in sensor fibers 100a, 100b and 100c.

Another application for the sensor fiber 100 is passive sensor networks. This is possible because these sensor elements (sensor fibers 100) can be time and wavelength multiplexed, as is the case with Bragg grating sensors.

Experimental Results

FIG. 1 shows schematically one embodiment of the experimental layout. The OTDR is used to measure fiber core attenuation at the location 154 via the sensing element 160 situated between two sections 155 of the sensor fiber 100. The first 4.5 km of the fiber 100 is the "dead zone" fiber, which in this embodiment is a splice of ordinary transmission fiber 100a (fiber section A, FIG. 1). It is followed by a 200 m section of the fiber 100 that has includes two sections 155 with random holes (airlines) 150 (fiber lengths section B and C, FIG. 1). In this embodiment, the holes 150 extend through the length of the fiber, with an exception of region 154. In the middle of the 200 m sensor fiber 100, in a short portion D (less than 1 mm long, for example) situated around 4.65 km, when measured from the input side of fiber 100a, the annular ring of random air lines 150 had been collapsed with a fusion splicer, forming sensing element 160. The collapse of airlines was complete, without any introduction of air bubbles (See FIG. 3).

Figure 6:
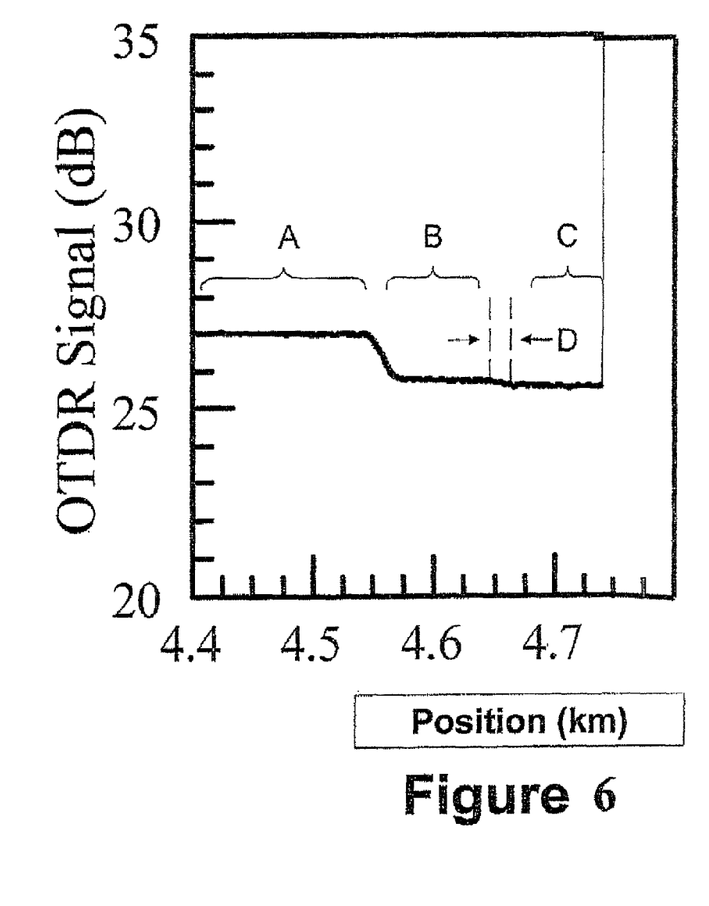
FIG. 6 is a graph illustrates OTDR signal in a system without disturbance(s)
Figure 7:
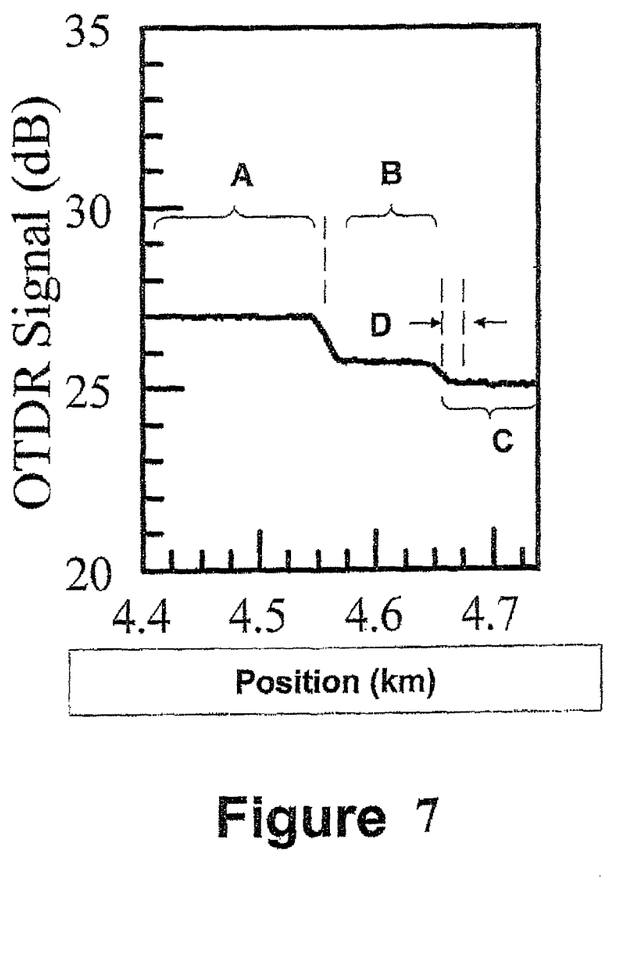
FIG. 7 is a graph illustrates OTDR signal in a system when a disturbance is present.

An OTDR measurement of the backscattered light is illustrated in FIGS. 6 and 7. The OTDR signal pulse width was chosen to be 200 ns, which means that the pulse has 20 m effective length. The trace corresponds to backscattered corresponding locations A, B, C and D in FIG. 1. In FIG. 6, we show the OTDR trace when the sensing element 160 is unperturbed (i.e., the collapsed and recoated portion of fiber 100 is straight). FIG. 6 shows a very slight loss incurred at location D (corresponding to a fiber sensing element 160) because of the fusion splicing and/or the micro-bend loss introduced during the manufacturing of the sensor fiber 100.

In the next step, we bent the sensing element 160 by bending the fiber 100 at the location 154 into a loop with diameter of 15 mm. FIG. 7 indicates a relatively large loss occurring in area 154 (location D). More specifically, as shown in FIG. 7, the bending produced an increased loss of about 0.7 dB. Thus, that the disturbance was detected at about 100 m distance from the input end of the fiber 100, or at about 4.65 km from the input end of fiber 100a. This experiment illustrates the bending sensitivity of the of fiber at location 154 (i.e., the bending sensitive of the fiber region with collapsed airlines) and demonstrates how the point location—bending site can be monitored via the sensing element 160. An advantage of utilizing the sensor fiber 100 that include sensing element 160 is that the exact location of the stress or break is known. It is noted that if a fiber with lower delta core is used, the sensitivity of the sensing and monitoring will be improved.

Additionally, a number of variations on the system shown in FIG. 1 exist that will improve the signal-to-noise (and hence speed) of the system or increase the range and resolution of the system.

According to some embodiments, a method of detecting a disturbance at a determinable portion along a length of optical fiber using backscattered optical signals comprises:

providing a sensor fiber 100 that includes at least two fiber sections 155 with a plurality of holes (e.g., airlines 150) and at least one other fiber section 160 situated between said at least two fiber sections 155, the at least one other fiber sections 160 being without the plurality of holes;

launching a pulsed optical signal for carrying within the sensor fiber 100;

obtaining a disturbance trace from the sensor fiber 100; and comparing the disturbance trace to an undisturbed trace so as to determine a disturbance at a portion of the sensor fiber 100.

In accordance with some embodiments of the present invention, a method of detecting a disturbance of at least one sensing element 160 at a location(s) 154 situated along a length of optical fiber using backscattered optical signals, wherein the method comprises:

providing a sensor fiber 100 that includes at least two fiber sections 155 with a plurality of holes and at least one other fiber section situated between said at least two fiber sections (sensing element(s) 160), wherein the at least one other fiber sections (corresponding to the sensing element 160) is/are without the plurality of holes 150;

launching a pulsed optical signal for carrying within the sensor fiber 100;

capturing a number (e.g., a predetermined number) of reflected signal traces from the sensor fiber 100;

utilizing the reflected signal trace(s) to obtaining a disturbance trace from the sensor fiber 100 (See FIG. 7, for example); and comparing the disturbance trace to the average (undisturbed) trace (See FIG. 6, for example) so as to determine a disturbance at a portion (D) of the sensor fiber which corresponds to a specific sensing element 160.

In accordance with one embodiment of the present invention, a method of detecting a disturbance of at least one sensing element situated along a length of optical fiber using backscattered optical signals comprises:

providing a sensor fiber 100 that includes at least two fiber sections 155 with a plurality of holes and at least one other fiber section situated between said at least two fiber sections (sensing element(s) 150), wherein the at least one other fiber sections is/are without the plurality of holes;

launching a pulsed optical signal for carrying within the sensor fiber capturing a predetermined number of reflected signal traces from the sensor fiber;

digitally filtering said predetermined number of reflected signal traces to form a plurality of digitally filtered traces;

averaging the digitally filtered traces to form an average trace;

obtaining a disturbance trace from the sensor fiber 100; and comparing the disturbance trace to the average trace so as to determine a disturbance at a portion (D) of the sensor fiber. Preferably the obtaining step includes filtering and averaging one or more disturbance traces.

According to some embodiments an OTDR system for detecting a perturbation comprises: (a) a transmitter launching a pulsed optical signal; (b) a sensor fiber 100 having at least two fiber sections 155 containing a plurality of holes 150 and one or more sensing elements 160 adjacent to one or more of the fiber sections, the sensor fiber caring at least a portion of the pulsed optical signal; (c) a receiver 110 accepting a portion of a backscattered optical signal from the sensor fiber; and (d) a signal processor for providing a signal response output indicative of a perturbation; wherein the backscattered optical signal provides information about location of the disturbance along the sensor fiber; and wherein the location of the disturbance along the sensor fiber corresponds to specific sensing element(s) 160 situated within the sensor fiber 100.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A bending sensitive sensor fiber comprising: (i) at least two fiber sections, each of said two fiber sections having a core and an annular region having a cross-section with a plurality of holes surrounding the core, such that diameters of said holes is smaller than core diameter and (ii) at least one other fiber section situated between said at least two fiber sections, said at least one other fiber sections being
without the plurality of holes, and
more bending sensitive than said at least two fiber sections with the plurality of holes.

2. The sensor fiber according to claim 1 wherein said plurality of holes are separated from one another by less than 1000 nm and wherein the mean diameter of the holes is less than 500 nm.

3. A sensor fiber comprising: (i) at least two fiber sections, each of said two fiber sections having a core and an annular region having a cross-section with a plurality of holes surrounding the core, such that diameters of said holes is smaller than core diameter and (ii) at least one other fiber section situated between said at least two fiber sections, said at least one other fiber sections being without the plurality of holes wherein said at least one other section has a larger bending sensitivity than said at least two fiber sections, and wherein said at least two fiber sections have a region without the holes surrounding said core, and said plurality of holes in said at least two fiber sections are situated around said region.

4. The sensor fiber according to claim 1 wherein said at least two fiber sections with a plurality of holes are characterized by radii $R_2$ and $R_3$ within which said plurality of holes are located and $6\ \mu m \leq R_2 < 20\ \mu m$ and $10\ \mu m \leq R_3 < 320\ \mu m$.

5. The sensor fiber according to claim 1 wherein said core has (i) a maximum refractive index delta greater than pure silica, and relative to pure silica, of less than 0.4% at 1550 nm wavelength, and (ii) outer radius $R_1$, such that $3\ \mu m \leq R_1 \leq 7.5\ \mu m$.

6. A fiber optic sensing system comprising: (a) transmitter launching an optical signal; (b) a sensor fiber of claim 1 to carry at least a portion of said optical signal sensitive to a disturbance therealong, and (c) a receiver for receiving a portion of a backscattered optical signal from said sensor.

7. A fiber optic sensing system comprising: an OTDR device optically coupled to the fiber of claim 1.

8. A fiber optic sensing system comprising: (a) transmitter for launching a wavelength invariant pulsed optical signal; (b) a bending sensitive sensor fiber to carry at least a portion of said optical signal sensitive to a disturbance therealong, said sensor fiber including sections with a plurality of holes surrounding a fiber core such that diameters of said holes are smaller than core diameter, and the section without said plurality of holes has a larger bending sensitivity than at two fiber sections with said plurality of holes; and (c) a receiver for receiving a portion of a backscattered optical signal from said sensor fiber.

9. The fiber optic sensing system of claim 8 wherein said sensor fiber comprises at least two fiber sections with a plurality of randomly distributed holes and at least one other fiber section situated between said at least two fiber sections, said at least one other fiber sections being without the plurality of randomly distributed holes.

10. The sensor fiber according to claim 9 wherein said plurality of holes are separated from one another by less than 1000 μm and wherein the mean diameter of the holes is less than 500 μm.

11. A method of detecting a disturbance at a determinable portion along a length of optical fiber using backscattered optical signals, said method comprising:
providing a sensor fiber that includes at least two fiber sections each with a plurality of holes surrounding fiber core, such that diameters of said holes is smaller than core diameter, and at least one other fiber section situated between said at least two fiber sections, said at least one other fiber section being more bending sensitive than said at least two fiber sections with the plurality of holes, said at least one other fiber sections being without the plurality of holes;
launching a pulsed optical signal for carrying within the sensor fiber;
capturing the backscattered optical signal traces from said sensor fiber;
obtaining a disturbance trace from said least one other fiber section without the plurality of holes of optical fiber; and
comparing said disturbance trace to an undisturbed trace so as to determine a disturbance at a portion of said optical fiber.

12. An OTDR system for detecting a perturbation, said OTDR system comprising: (A) a transmitter launching a pulsed optical signal; (B) a sensor fiber, the sensor fiber having (i) at least two fiber sections each containing a plurality of holes surrounding a fiber core, such that diameters of said holes is smaller than core diameter, and (ii) sensing elements adjacent to said fiber sections that are being more sensitive than said at least two fiber sections with the plurality of holes, said sensor fiber caring at least a portion of said pulsed optical signal; (C) a receiver accepting a portion of a backscattered optical signal from the sensor fiber; and (D) a signal processor for providing a signal response output indicative of a perturbation; wherein said backscattered optical signal provides information about location of the disturbance along the sensor fiber; and wherein the location of the disturbance along the sensor fiber corresponds to specific sensing elements situated within said fiber.

13. The OTDR system of claim 12, wherein said sensing elements are bend sensitive sections of optical fiber.

14. The OTDR system of claim 13, wherein the holes are separated from one another by less than 1000 nm and wherein the mean diameter of the holes is less than 500 nm.

15. The sensor fiber according to claim 1, wherein said plurality of holes have diameters smaller than the diameter of said core.

16. The sensor fiber according to claim 15, wherein said core diameter is greater than 6 μm, and mean diameter of the holes is less than 1000 nm.

17. The fiber optic sensing system according to claim 8, wherein said plurality of holes have diameters smaller than the diameter of said core.

18. The fiber optic sensing system according to claim 17, wherein said core diameter is greater than 6 μm, and mean diameter of the holes is less than 1000 nm.

19. The OTDR system according to claim 12, wherein said plurality of holes have diameters smaller than the diameter of said core.

20. The OTDR system according to claim 19, wherein said core diameter is greater than 6 μm, and mean diameter of the holes is less than 1000 nm.

* * * * *